Feb. 16, 1943.   N. A. LAURY   2,311,619
PREPARATION OF CHLOROSULPHONIC ACID
Filed April 12, 1940
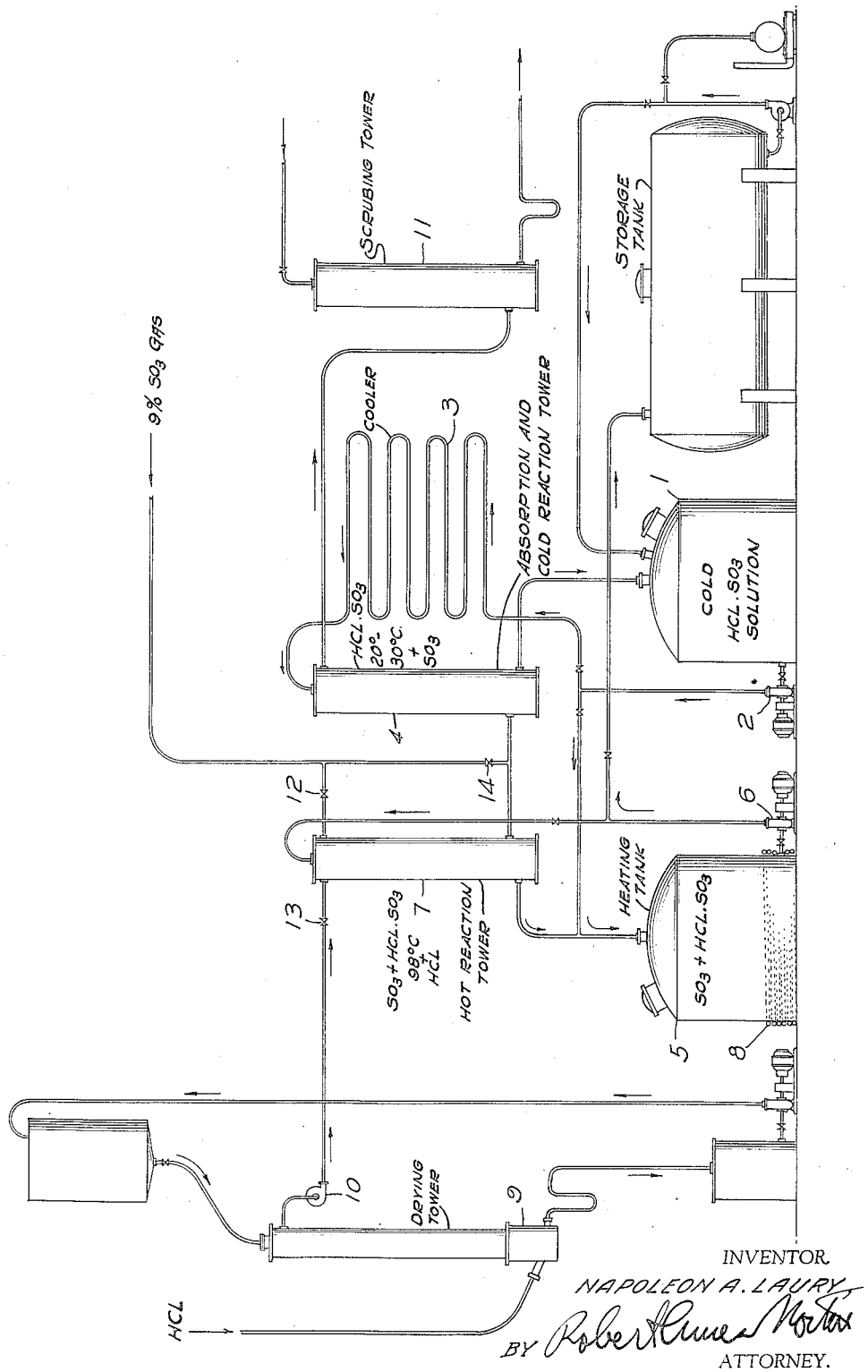
INVENTOR.
NAPOLEON A. LAURY
BY Robert Bruce Morton
ATTORNEY.

Patented Feb. 16, 1943

2,311,619

UNITED STATES PATENT OFFICE 2,311,619

PREPARATION OF CHLORSULPHONIC ACID

Napoleon Arthur Laury, Bound Brook, N. J., assignor to American Cyanamid Company, New York, N. Y., a corporation of Maine Application April 12, 1940, Serial No. 329,243

4 Claims. (Cl. 23—139)

The present invention relates to a method of preparing chlorsulphonic acid, and more particularly to an improved method of manufacturing chlorsulphonic acid by causing sulphur trioxide and hydrogen chloride to react in the presence of chlorsulphonic acid as solvent.

In the past, chlorsulphonic acid has been prepared by reacting hydrochloric acid and sulphur trioxide in the presence of chlorsulphonic acid as a solvent, the reaction mixture being maintained at a low temperature. The yields of chlorsulphonic acid obtained in this manner are poor since the reaction of sulphur trioxide and hydrogen chloride is relatively incomplete at low temperatures. Attempts have been made to increase the efficiency of the reaction by operating at a higher temperature but the results are even more unsatisfactory since there is considerable loss of sulphur trioxide and uncondensed chlorsulphonic acid from the reaction vessel.

According to the present invention, the above difficulties have been solved by a two-step process, each step of which by itself is impracticable, but the combination of the two gives rise to unexpected and improved results.

Reaction between hydrogen chloride and a chlorsulphonic acid solution of sulphur trioxide containing about 30% $SO_3$ is effected at a high temperature, preferably about 98° C. At this temperature reaction is rapid and fairly complete, but the vapor pressure of chlorsulphonic acid is high and considerable quantities of the product are carried off by the inert gases introduced with the relatively impure hydrogen chloride gas. This loss of chlorsulphonic acid is much greater than that occurring in prior art processes.

The escaping gases are passed through chlorsulphonic acid maintained at a temperature of about 30° C. This second step of my process provides additional time for remaining traces of free gases to react and any escaping chlorsulphonic acid vapors are condensed.

The overall cost of the two steps is less than that of the prior art process in spite of the fact that either step alone gives commercially useless results.

The invention will be described in greater detail with reference to the accompanying flow sheet which illustrates diagrammatically a commercial chlorsulphonic acid plant, but it should be understood that the invention is not limited to the exact details therein set forth.

Chlorsulphonic acid in tank 1 is circulated by means of pump 2 through cooler 3, where it is cooled to about 20–30° C., into tower 4 and back to tank 1. Gas containing about 9% $SO_3$ is passed into tower 4 from a contact sulphuric acid converter until the solution in tank 1 contains about 40% $SO_3$, when the supply of sulphur trioxide gas is shut off at 14.

The major portion of the charge is transferred to tank 5 and there heated to about 98° C. by means of steam coil 8. The heated solution is circulated through tower 7 by means of pump 6. A fresh lot of chlorsulphonic acid is added to the residual chemically uncombined sulphur trioxide-containing chlorsulphonic acid in tank 1 and circulated through cooler 3 and tower 4.

Thus, at this stage of the process, the system comprising tank 1, cooler 3, and tower 4 contains chlorsulphonic acid containing an amount of chemically uncombined sulphur trioxide.

Gas from a hydrochloric acid plant is drawn through a drying tower 9 by means of blower 10 and the dried gas carried in series through towers 7, which contain the sulphur trioxide solution in chlorsulphonic acid at about 98° C., and 4, which contains chlorsulphonic acid at about 20–30° C. The course of the gas in tower 7 is from top to bottom in cocurrent to the hot chlorsulphonic solution.

The final chlorsulphonic acid product, i. e., that portion of the chlorsulphonic acid formed in tower 7 which is not decomposed due to the high temperature prevailing in the tower, is pure and uncontaminated by chemically uncombined sulphur trioxide or hydrogen chloride because these products, due to the high temperature, are carried over into tower 4. The chlorsulphonic acid is collected in tank 5 from which it is removed by means of pump 6 to a storage tank at the completion of a cycle. The course of the reaction is followed by testing the solution in tank 5 for chemically uncombined sulphur trioxide and when all the sulphur trioxide has reacted, the current of hydrogen chloride is shut off.

Any additional chlorsulphonic acid formed in tower 4 either by condensation of volatilized chlorsulphonic acid, recombination of decomposed chlorsulphonic acid, or reaction between hydrogen chloride and the chemically uncombined sulphur trioxide always present in the tower is collected in tank 1. This chlorsulphonic acid is then available for use in the next operation of the process. Hydrogen chloride is scrubbed out of vapors escaping from tower 4 by means of tower 11 and any residual sulphur trioxide fog is returned to the contact plant filter.

It should be understood that the present invention is not limited to the use of dilute sulphur trioxide gas from a contact sulphuric acid converter. Other sources of sulphur trioxide such as the concentrated gas from the distillation of oleum may be used since the process of the invention and its advantages are independent of the past history of the reacting sulphur trioxide solution. However, it will be apparent that the use of dilute converter gases results in a more economical process because of their much lower cost per unit of $SO_3$. It is also more convenient and is the preferred embodiment of the present invention.

By comparing the process described above with processes of the prior art, it will be seen that the process of my invention is more economical especially for small scale operation, that is, plants having a daily capacity up to about ten tons. In a plant where both the reactants are already being made, very little additional equipment is needed and the product obtained is of high grade.

What I claim is:

1. The process of manufacturing chlorosulphonic acid which comprises rapidly reacting sulphur trioxide in chlorsulphonic acid solution with hydrogen chloride gas at such a temperature that some sulphur trioxide, hydrogen chloride and chlorsulphonic acid vapors are evolved and a residue of substantially pure chlorsulphonic acid is obtained and passing the evolved vapors through chlorsulphonic acid containing an amount of chemically uncombined $SO_3$ at a temperature of about 20°–30° C.

2. The process of manufacturing chlorsulphonic acid which comprises dissolving sulphur trioxide in chlorsulphonic acid, introducing hydrogen chloride gas into the solution at such a temperature that some sulphur trioxide, hydrogen chloride and chlorsulphonic acid vapors are evolved and a residue of substantially pure chlorsulphonic acid is obtained and passing the evolved vapors through chlorsulphonic acid containing an amount of chemically uncombined $SO_3$ at a temperature of about 20°–30° C.

3. The process of manufacturing chlorsulphonic acid which comprises dissolving sulphur trioxide contained in contact sulphuric acid converter gases in cool chlorsulphonic acid, heating the solution to an elevated temperature, introducing hydrogen chloride gas therein at such a temperature that some sulphur trioxide, hydrogen chloride and chlorsulphonic acid vapors are evolved and a residue of substantially pure chlorsulphonic acid is obtained, and passing the evolved vapors through an additional amount of chlorsulphonic acid containing chemically uncombined sulphur trioxide at a temperature of about 20°–30° C.

4. A process according to claim 3 in which the sulphur trioxide containing chlorsulphonic acid is heated to about 93° C. in the first step of the process.

NAPOLEON ARTHUR LAURY.